Patented May 20, 1952

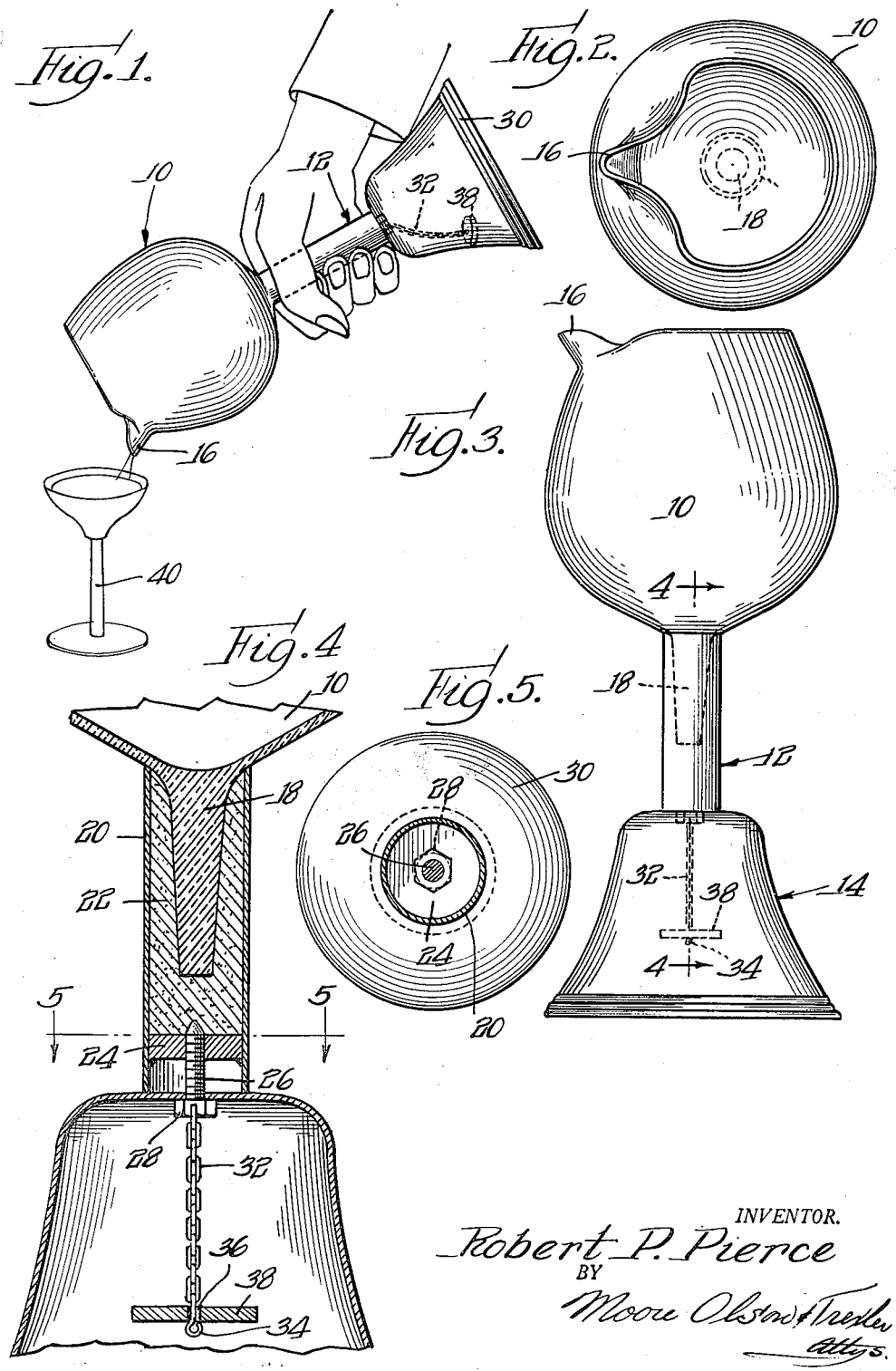

2,597,522

UNITED STATES PATENT OFFICE 2,597,522

SIGNALING DRINK MIXER

Robert P. Pierce, Chicago, Ill.

Application December 8, 1947, Serial No. 790,321

3 Claims. (Cl. 116—152)

The present invention relates to new and useful improvements in receptacles and more particularly to improvements in a receptacle for liquids which may be poured or directly consumed therefrom.

The invention is generally concerned with a beverage dispensing receptacle having a container portion in the form of an individual drinking glass from which the beverage may be directly consumed or a larger container, such as a pitcher, cocktail shaker, or the like, from which beverages may be poured into smaller receptacles or in which beverages may be mixed prior to pouring. The receptacle also includes a supporting base spaced from the container portion and connected thereto by an intermediate handle portion by which the assembly may be grasped for manipulation.

An object of the invention is to provide a receptacle substantially of the above type having improved means for connecting the container portion to the base through the intermediate handle portion.

A further object of the invention is to provide a beverage dispensing receptacle having associated therewith an audible sounding device which is operable upon manipulation of the receptacle.

A further object of the invention is to provide a receptacle of the above type including a beverage container portion and a stand in the form of an audible signal such as a bell, or sounding device, whereby manipulation of the receptacle will effect sounding thereof.

A still further object of the invention is to provide a beverage receptacle of the above type wherein the bell clapper is carried on a flexible connection so that tipping of the receptacle will result in a prolonged rather than a single sounding of the bell.

The invention further aims to provide a beverage receptacle of the above type which consists of a minimum number of parts and which is readily assembled.

The above and other objects of the invention will in part be obvious and will hereinafter be more fully pointed out.

In the accompanying drawing, wherein like reference characters refer to like parts throughout the several views:

Figure 1 is a perspective view of a pitcher or shaker from which the contents are being poured into a glass;

Figure 2 is a top plan view of the receptacle;

Figure 3 is a side elevation of the receptacle;

Figure 4 is an enlarged sectional view taken along the line 4—4 of Figure 3; and Figure 5 is a sectional view taken along the line 5—5 of Figure 4.

Referring more in detail to the accompanying drawing and particularly to Figures 1, 2 and 3, it will be seen that the receptacle assembly includes a beverage container portion 10, a handle portion 12 and a supporting base portion 14. As illustrated, the container portion 10 is in the form of a pitcher or other container having a pouring lip 16, but it is to be clearly understood that the invention is contemplated for use as a drinking glass from which the contents are directly consumed rather than poured to another receptacle.

The container portion 10 may be formed of glass or other suitable material and may be attractively decorated in various ways. This container includes a depending stem portion 18 which extends into a tubular member 20 forming the handle grasping portion 12. This tubular portion 20 is of substantially smaller cross section than the adjacent surfaces of the base 14 and the receptacle 10 in order to provide a confining hand or finger grip portion bounded at the top and bottom by the base of the receptacle and the top of the bell, respectively. Within the tubular member 20 there is provided a filling 22 of cork or other insulating and cushioning material which is recessed to permit the stem 18 to be embedded therein so as to eliminate jarring of the container portion. The stem 18 is adhesively secured to the filling material 22.

The bottom end of the tubular member 20 is closed by a plug 24 serving to seal off and support the cork filling material, which, however, may be cemented to the inner surface of the tube for additional support, if desired. The plug 24 may be secured within the tubular member 20 in any suitable manner, as by welding or the like. This plug 24 is provided with a central threaded aperture within which a screw element 26 is secured. The screw element is provided with a head or nut portion 28 by which the screw may be tightened. It will be noted that the nut portion 28 underlies an opening in the top portion of a bell element 30 so that upon tightening of the screw, the top portion of the bell element will be firmly seated against the bottom edge of the tubular member 20. A chain 32 or other type of flexible connector is supported from the handle portion through the nut 28 and carries at the lower free end thereof an eyelet 34 which extends through an opening 36 in a clapper member 38 for securing the same. Thus, there is provided a swivel connection between the chain 32 and the clapper 38 to aid in the free movement, such as rolling, thereof over the bell surface.

From the foregoing description, it will be seen that the present invention provides a beverage receptacle assembly having associated therewith an audible sounding device which will add merriment to assembled gatherings at festive occasions or which will signal the commencement of such gatherings. Thus, if the receptacle is used as one of a set of drinking goblets or the like, elevation and tipping thereof will cause the clapper 38 to contact the bell 30 and give an audible sounding effect. Likewise, when the receptacle is used as shown in Figure 1, that is, as a beverage mixer and dispenser, tilting of the receptacle to pour its contents into a glass 40 or the like will cause the clapper to strike the bell 30 and by reason of the flexible connector 32 and mounting for the clapper, it will ride down and roll over the bell surface so as to prolong the sounding effect. The beverage receptacle of the present invention affords a novel and attractive and pleasant sounding noise maker for use at appropriate festive gatherings. Likewise, the receptacle can also serve as an audible signal to indicate commencement of the festive occasion.

While one form of the invention has been shown and described for purposes of illustration, it is to be clearly understood that various changes in the details of construction and arrangement of parts may be accomplished without departing from the scope and spirit of the invention as set forth in the appended claims.

I claim:

1. A hand manipulated signal assembly adapted for use with a liquid dispensing receptacle and comprising a hollow supporting base in the form of a bell, a tubular handle portion extending substantially vertically from said base and having secured therein a plug element adjacent said base, screw means engaging said plug element for securing said base to said handle portion, a cushioning and insulating filler secured in said tubular handle portion above said plug element and having an upwardly open recess, adapted to receive a stem on the receptacle and a bell clapper depending from said screw means within said hollow base, whereby grasping of the handle portion to tilt or otherwise manipulate the assembly will result in a sounding effect.

2. A hand manipulated receptacle assembly comprising an upper container portion, a lower supporting base in the form of a bell and spaced from the adjacent end of the container portion, an intermediate handle portion connecting and spacing said base and said container portion and providing a hand grip therebetween, and a clapper supported from said handle portion within said base and normally inoperative when the receptacle is at rest on the lower peripheral edge of the bell but operable to strike the bell and cause an audible sound upon manipulation of the assembly by grasping the handle portion.

3. A hand manipulated receptacle assembly as claimed in claim 2, wherein the intermediate handle portion is in the form of an elongated and reduced diameter sleeve bearing on the bottom of the container portion and the top of the bell portion and secured therebetween.

ROBERT P. PIERCE.

REFERENCES CITED

The following references are of record in the file of this patent:

UNITED STATES PATENTS

| Number | Name | Date |
| --- | --- | --- |
| D. 304,181 | Curtis | Aug. 26, 1884 |
| 352,051 | Fulda | Nov. 2, 1886 |
| 367,642 | Lane | Aug. 2, 1887 |
| 475,526 | Trottier | May 24, 1892 |
| 623,589 | Worns | Apr. 25, 1899 |
| 781,846 | Neahr | Feb. 7, 1905 |
| 862,379 | Banford | Aug. 6, 1907 |
| 1,807,518 | Flamma | May 26, 1931 |